United States Patent [19]
Cuffaro et al.

[11] Patent Number: 5,999,814
[45] Date of Patent: Dec. 7, 1999

[54] METHOD OF DETECTING AND INHIBITING MOBILE STATION HANDOFF OSCILLATIONS IN A CELLULAR TELECOMMUNICATIONS NETWORK

[75] Inventors: Angelo Cuffaro, Pierrefonds; Mahshid Izady, St-Laurent, both of Canada

[73] Assignee: Telefonaktiebolaget LM Ericsson (publ), Stockholm, Sweden

[21] Appl. No.: 09/072,937

[22] Filed: May 5, 1998

[51] Int. Cl.$^6$ .................................................. H04Q 7/00
[52] U.S. Cl. .................... 455/436; 455/11.1; 455/561; 370/331; 370/332
[58] Field of Search ...................... 455/436, 443, 455/439, 440, 444, 524, 525, 11.1, 500, 517, 550, 557, 561, 573; 370/331, 332, 310, 315

[56] References Cited

U.S. PATENT DOCUMENTS

| | | | |
|---|---|---|---|
| 5,434,798 | 7/1995 | Madebrink et al. | 364/514 |
| 5,530,910 | 6/1996 | Taketsugu | 455/33.2 |
| 5,542,097 | 7/1996 | Ward et al. | 455/33.2 |
| 5,623,535 | 4/1997 | Leung et al. | 379/60 |
| 5,640,414 | 6/1997 | Blakeney et al. | 375/200 |
| 5,640,676 | 6/1997 | Garncarz et al. | 455/33.2 |
| 5,754,945 | 5/1998 | Lin et al. | 455/33.2 |
| 5,774,809 | 6/1998 | Tuutijarvi et al. | 455/436 |
| 5,774,814 | 6/1998 | Haas | 455/436 |
| 5,781,862 | 7/1998 | Da Silva et al. | 455/436 |
| 5,784,695 | 7/1998 | Upton et al. | 455/436 |
| 5,805,995 | 9/1998 | Jiang et al. | 455/436 |
| 5,890,069 | 3/1999 | Evans et al. | 455/462 |

FOREIGN PATENT DOCUMENTS 2301733  12/1996  United Kingdom.

*Primary Examiner*—Wellington Chin
*Assistant Examiner*—Congvan Tran
*Attorney, Agent, or Firm*—Smith & Danamraj, P.C.

[57] ABSTRACT

A method of handling oscillating mobile station handoffs between cells in a cellular telecommunications network. The method comprises the steps of detecting whether a mobile station (MS) is exhibiting an oscillating handoff pattern, determining whether the MS's signal strength with the MS's serving cell is above a safe signal strength threshold, and inhibiting handoffs of the MS upon determining that the signal strength is above the safe signal strength threshold. The oscillating handoff pattern is detected by first detecting a sequence of handoffs of the MS in which the number of handoffs is twice the number of cells involved in the handoffs, measuring an inter-handoff time period between each handoff in the sequence, and determining whether each inter-handoff time period is less than a first threshold value. This is followed by determining an oldest handoff and a latest handoff in the sequence, measuring a total oscillation time period between the oldest handoff and the latest handoff in the sequence, determining whether the total oscillation time period is less than a second threshold value, and classifying the MS as oscillating upon determining that the total oscillation time period is less than the second threshold value.

11 Claims, 4 Drawing Sheets

METHOD OF DETECTING AND INHIBITING MOBILE STATION HANDOFF OSCILLATIONS IN A CELLULAR TELECOMMUNICATIONS NETWORK

BACKGROUND OF THE INVENTION

1. Technical Field of the Invention

This invention relates to telecommunication systems and, more particularly, to a method of detecting and inhibiting mobile station handoff oscillations between cells in a cellular radio telecommunications network.

2. Description of Related Art

Mobile stations (MSs) will sometimes be handed off back and forth in a fairly rapid manner between two or more cells. This phenomenon is known as handoff oscillations, and has many adverse effects in the cellular network. First, temporary muting is experienced by the subscriber during each handoff, and this adversely affects voice quality when it is repeatedly experienced in a short period of time. Second, the probability of dropping the call is cumulatively increased since the probability of dropping a call is increased during each handoff. Third, the repeated handoffs add to the processor load in the network.

One of the main causes of handoff oscillations is the manner in which MSs obtain signal strength measurements from the serving cell and candidate neighboring cells. Erroneous signal strength measurements from neighbor cells can be caused by a design defect in certain MSs or by poor cell planning causing co-channel interference or poor propagation in certain areas. Therefore, MSs often do not report the correct signal strengths, making the signal strength from the neighbor cell appear better than it actually is, and better than the serving cell. The handoff is then performed based on the erroneous measurements. This places the MS in a new serving cell where the measurements then show that the signal strength is better in the old serving cell. Therefore, another handoff is performed back to the old serving cell.

Although there are no known prior art teachings of a solution to the aforementioned deficiency and shortcoming such as that disclosed herein, U.S. Pat. No. 5,623,535 to Leung et al. (Leung), U.S. Pat. No. 5,530,910 to Taketsugu (Taketsugu), and U.K. Patent Application GB 2 301 733A to Gilliland (Gilliland) discuss subject matter that bears some relation to matters discussed herein. Leung discloses a method of operating a layered cellular network having macrocells which overlay a plurality of microcells. Leung compiles mobility statistics for each MS and passes the statistics to the base stations in the networks. The mobility statistics are then utilized to make decisions regarding whether to assign each MS to a microcell or a macrocell. However, Leung does not teach or suggest a method of detecting and inhibiting handoff oscillations in a cellular telecommunications network.

Taketsugu discloses a method of controlling handoffs in a cellular telecommunications network having cells of differing sizes. Taketsugu measures the number of handoffs experienced by each MS, and the measurement is then utilized to determine the size of cell to which the MS should be handed off. Taketsugu, however, does not teach or suggest a method of detecting and inhibiting handoff oscillations in a cellular telecommunications network.

Gilliland discloses a method of controlling handoffs in a cellular telecommunications network having macrocells and microcells. Gilliland determines the speed of each MS by counting the number of handoffs which have occurred in a preceding period, or by counting the number of measurement reports in the preceding period. The MS's speed is then utilized to determine whether to hand off the MS to a macrocell or a microcell. However, Gilliland does not teach or suggest a method of detecting and inhibiting handoff oscillations in a cellular telecommunications network.

Other solutions to the handoff oscillation problem have been proposed, but each known proposed solution utilizes a hysteresis value to control the rate of oscillating handoffs. In order for a handoff to be performed, the signal strength from a candidate neighboring cell must exceed the signal strength of the serving cell by the hysteresis amount. However, a disadvantage to this approach is that every MS in the cell is affected when the hysteresis value is determined and set. The hysteresis value necessarily reduces the network's handoff performance. For MSs experiencing severe handoff oscillation problems, this trade-off is acceptable. However, all MSs are not uniformly affected by oscillating handoffs. For those MSs that are not experiencing oscillating handoffs, the hysteresis solution degrades their performance without any counter-balancing benefit. In addition, other factors such as interference may require that the value of the hysteresis be set higher, thereby further degrading handoff performance for all MSs in the cell.

Review of each of the foregoing references reveals no disclosure or suggestion of a method such as that described and claimed herein. In order to overcome the disadvantage of existing solutions, it would be advantageous to have a method of detecting and inhibiting handoff oscillations between cells in a cellular radio telecommunications network. Such a method would operate on a per-mobile station basis rather than utilizing hysteresis on a cell-wide basis. The present invention provides such a method.

SUMMARY OF THE INVENTION

In one aspect, the present invention is a method of handling oscillating mobile station handoffs between cells in a cellular telecommunications network having a mobile switching center (MSC) which controls the cells, and a plurality of mobile stations (MSs) operating in the cells. The method comprises the steps of detecting whether a MS is exhibiting an oscillating handoff pattern, and inhibiting handoffs of the MS upon detecting that the MS is exhibiting an oscillating handoff pattern. Before inhibiting handoffs, the method may determine whether the MS's signal strength with the MS's serving cell is above a safe signal strength threshold, and inhibit handoffs only if the signal strength is above the safe signal strength threshold.

In detecting whether a MS is exhibiting an oscillating handoff pattern, the method may begin by detecting a sequence of handoffs of the MS in which the number of handoffs is twice the number of cells involved in the handoffs, measuring an inter-handoff time period between each handoff in the sequence, and determining whether each inter-handoff time period is less than a first threshold value. This is followed by determining an oldest handoff and a latest handoff in the sequence, measuring a total oscillation time period between the oldest handoff and the latest handoff in the sequence, determining whether the total oscillation time period is less than a second threshold value, and classifying the MS as oscillating upon determining that the total oscillation time period is less than the second threshold value.

In another aspect, the present invention is a method of detecting a mobile station (MS) which is exhibiting an oscillating handoff pattern between cells in a cellular telecommunications network. The method includes the steps of detecting a sequence of handoffs of the MS in which the number of handoffs is twice the number of cells involved in the handoffs, measuring an inter-handoff time period between each handoff in the sequence, and determining whether each inter-handoff time period is less than a first threshold value. This is followed by determining an oldest handoff and a latest handoff in the sequence, measuring a total oscillation time period between the oldest handoff and the latest handoff in the sequence, determining whether the total oscillation time period is less than a second threshold value, and classifying the MS as oscillating upon determining that the total oscillation time period is less than the second threshold value.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention operates on a per-mobile station basis in order to ascertain whether certain MSs are experiencing oscillating handoffs, and to target a solution to those MSs. When utilized herein, the term "handoff" means an intercell handoff between cells in a cellular network, not an intracell handoff between channels within a single cell. Basically, the method determines whether a pattern of handoffs is repeated for a given MS within a predetermined time period. The time period is important because a MS is not oscillating, even if it is being handed off back and forth, if it spends long periods of time in each cell. However, if a MS is being handed off back and forth rapidly (for example, every 10 seconds), then it is oscillating. The present invention first detects a MS experiencing oscillating handoffs, and then inhibits further handoffs for an inhibition time period.

Figure 1:
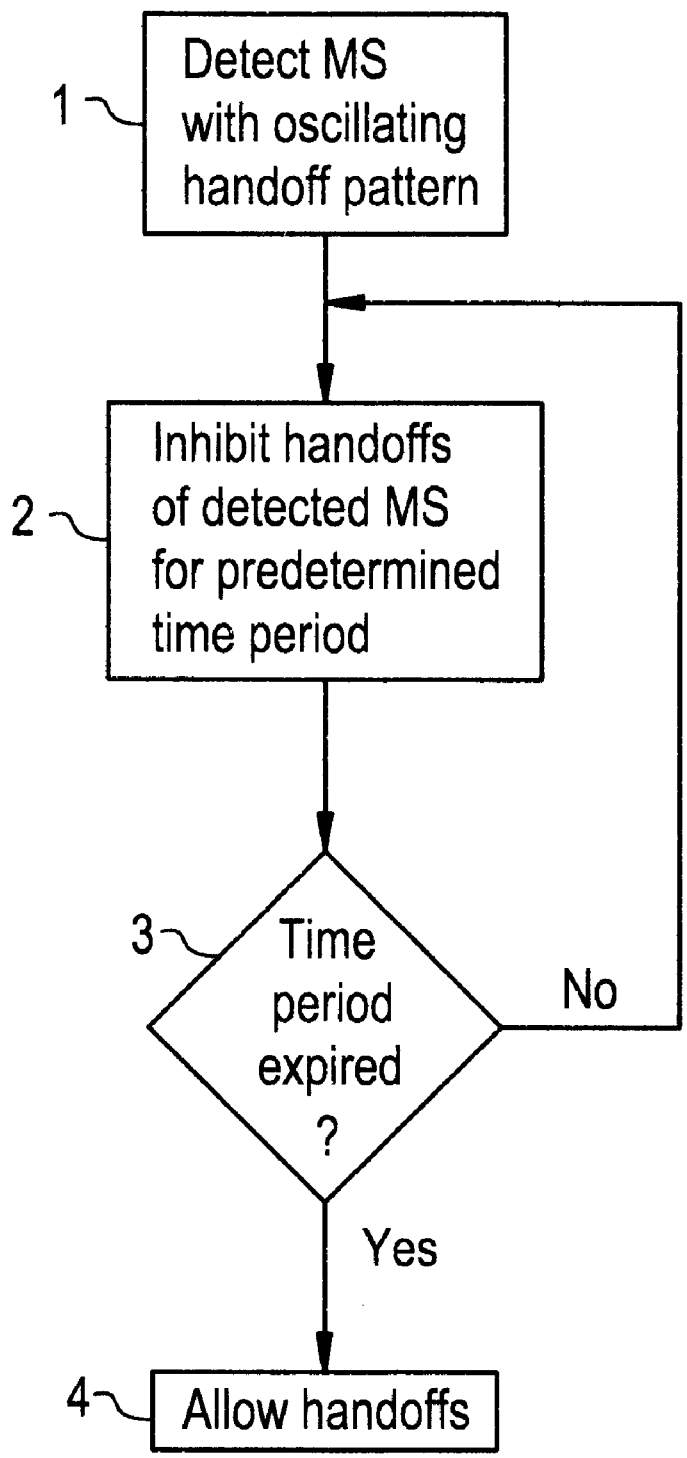
FIG. 1 is a flow chart illustrating the steps of the overall oscillation detection and inhibition process of the present invention.

FIG. 1 is a flow chart illustrating the steps of the overall oscillation detection and inhibition process of the present invention. At step 1, an oscillation detection process detects a MS with an oscillating handoff pattern. At step 2, further handoffs of the oscillating MS are inhibited for a predetermined period of time, for example, one minute. The process then moves to step 3 where it is determined whether or not the time period has expired. If not, the process returns to step 2 and continues to inhibit handoffs of the oscillating MS. When the time period expires, the process moves to step 4, and once again allows handoffs of the MS.

Oscillating Handoff Detection

Handoff oscillations may be detected between 2, 3, or more cells. For example, the MS may go back and forth from cell A to cell B, or may move from A to B to C and then back to A to B to C, etc. The detection process determines that there is an oscillating condition based on the number of handoffs, the time period between each handoff, and a total elapsed time period.

Figure 2A:
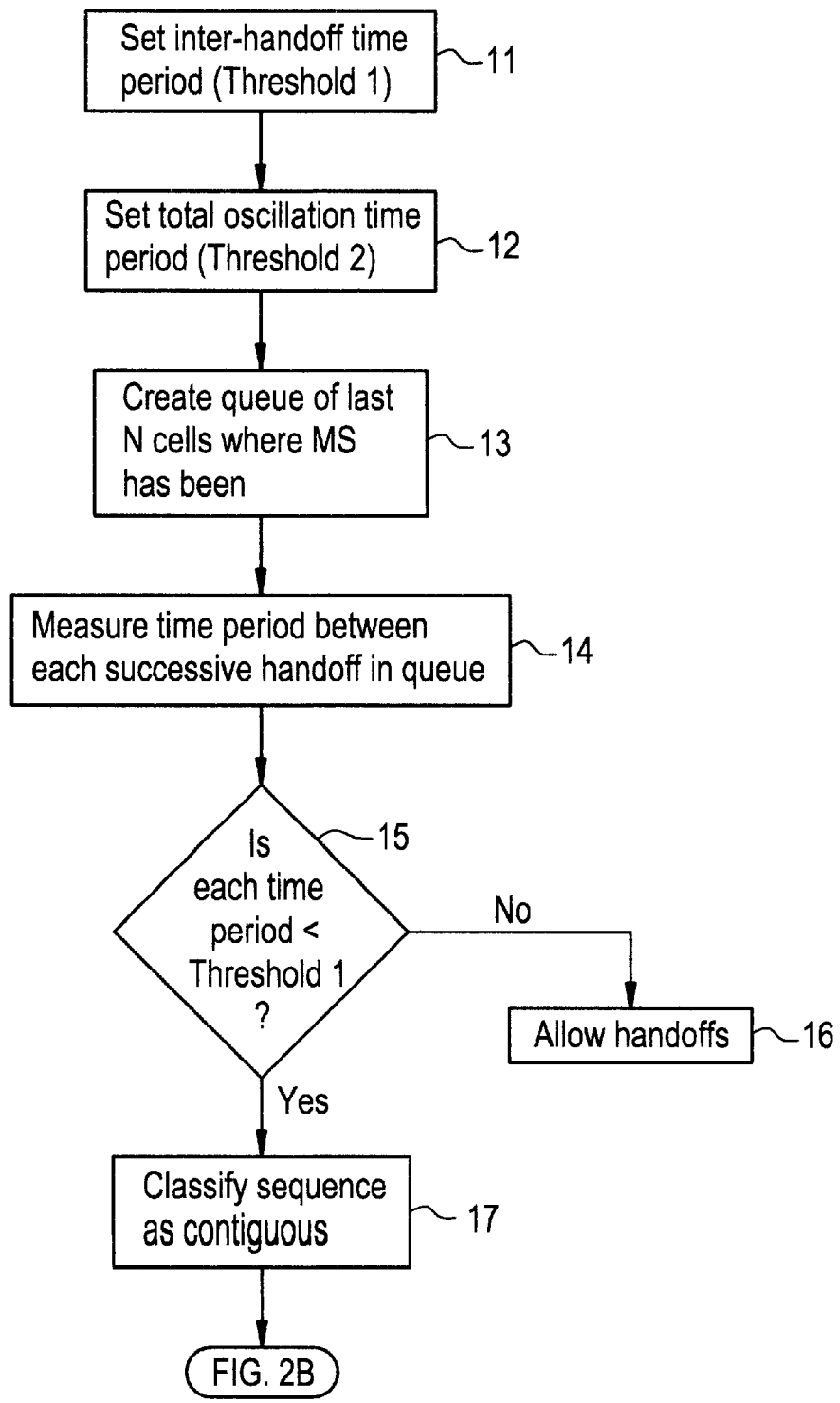
FIGS. 2A and 2B are a flow chart illustrating the steps of the oscillation detection process of the present invention.
Figure 2B:
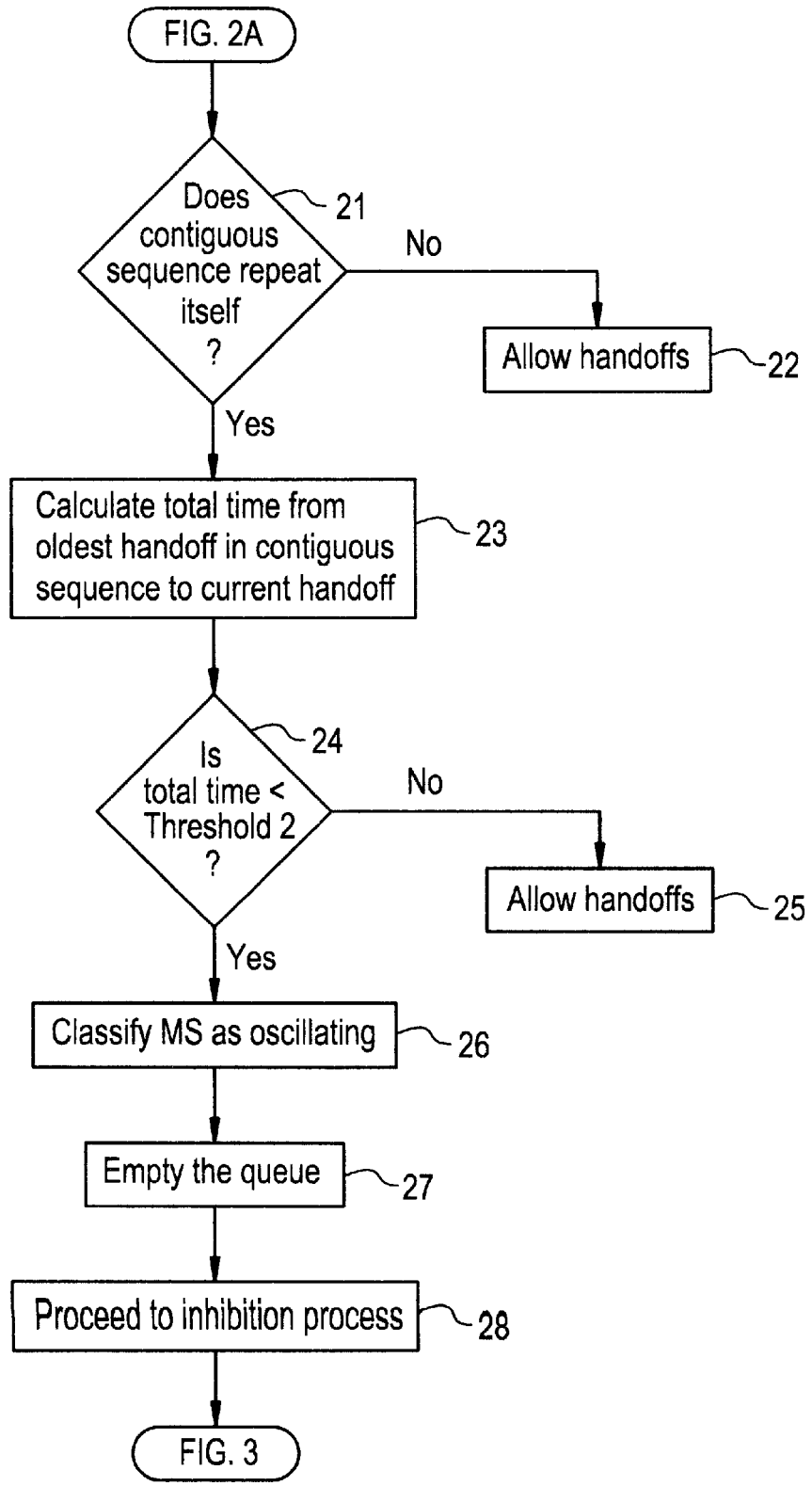

FIGS. 2A and 2B are a flow chart illustrating the steps of the oscillation detection process of the present invention. At step 11, an inter-handoff time period (Threshold 1) is set. The inter-handoff time period is the time between successive handoffs of a single MS. The MSC maintains a queue that stores the last "N" cells where the MS has been. A measured condition is classified as oscillating if a contiguous handoff sequence is detected, and it repeats itself at least once within a total oscillation time period. The MSC considers the handoff sequence contiguous if the time period between successive handoffs is less than Threshold 1 (for example, 15 seconds). A contiguous sequence is considered oscillating if the time between the current handoff and the oldest handoff in the contiguous sequence (the total oscillation time period) is less than Threshold 2 (for example, 45 seconds). At step 12, Threshold 2 is set.

At step 13, the MSC creates the queue that stores the last "N" cells where the MS has been. At step 14, the inter-handoff time period is measured between each successive handoff in the queue. At 15, it is determined whether or not each measured inter-handoff time period is less than Threshold 1. If not, the sequence is not contiguous, and the process moves to step 16 and allows handoffs of the MS. If each measured interhandoff time period is less than Threshold 1, the process moves to step 17 and classifies the sequence as contiguous. The process then moves to FIG. 2B.

At step 21, it is determined whether or not the contiguous sequence repeats itself. If not, the process moves to step 22 and allows handoffs of the MS. However, if the sequence repeats itself, the process moves to step 23 and calculates the total time from the oldest handoff in the contiguous sequence to the current handoff (i.e., the total oscillation time period). At step 24 it is determined whether or not the total oscillation time period is less than Threshold 2. If not, the process moves to step 25 and allows handoffs of the MS. However, if the total oscillation time period is less than Threshold 2, then the MS is classified as oscillating at 26. At step 27, the queue for the oscillating MS is emptied, and the process continues to the inhibition process illustrated in FIG. 3.

Thus, each inter-handoff time period must be less than Threshold 1, and the total oscillation time period must be less than Threshold 2 before a MS is classified as oscillating. For example, two inter-handoff time periods could be measured as 10 seconds, and then the MS could go 30 seconds before the next handoff. Threshold 2 is met (i.e., less than 45 seconds between the current handoff and the oldest handoff in the sequence, but Threshold 1 is not met since one of the inter-handoff periods was greater than 15 seconds. In this case, the condition is not classified as oscillating.

Table 1 below illustrates a condition which is classified as oscillating when Threshold 1=15 seconds and Threshold 2=45 seconds. Each inter-handoff time period is less than 15 seconds, and the total time from the oldest handoff to the current handoff is 28 seconds (less than 45 second).

TABLE 1

| CELL QUEUE POSITION | CELL | TIME CELL WAS ENTERED | INTER-HANDOFF PERIOD | OVERALL TIME PERIOD |
|---|---|---|---|---|
| CURRENT CELL N – 1 | | 12:01:45 | | |
| N – 2 | B | 12:01:38 | 13 SECS. | 28 SECS. |
| N – 3 | A | 12:01:25 | 5 SECS. | 15 SECS. |
| . . . | B | 12:01:20 | 10 SECS. | 10 SECS. |
| OLDEST CELL 0 | A | 12:01:10 | | |

Figure 3:
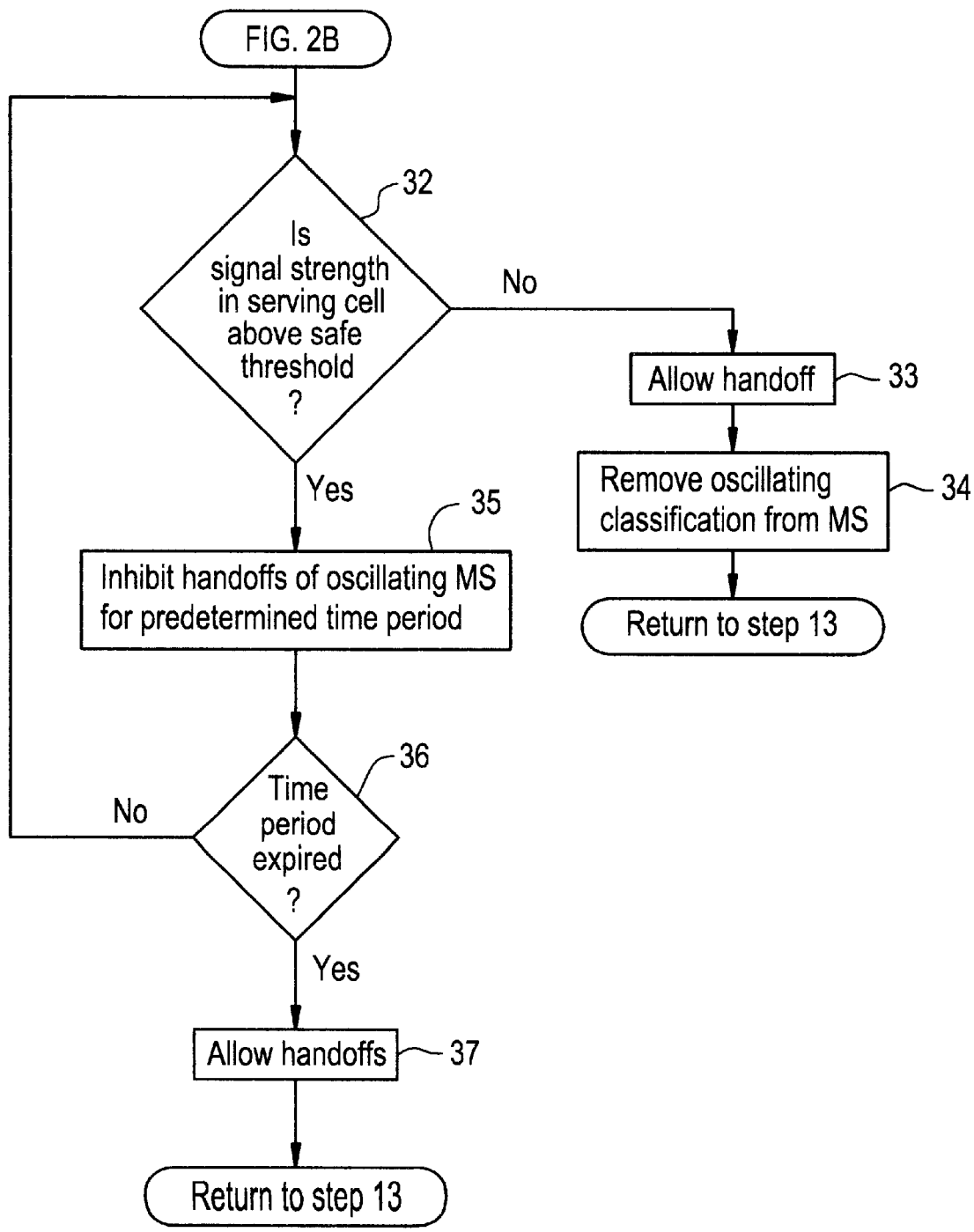
FIG. 3 is a flow chart illustrating the steps of the oscillation inhibition process of the present invention.

As long as two cells are involved in the repetitive handoffs, the process maintains a rolling window which has a maximum length of the last four cells in which the MS has been located. The process discards cells from the table whenever conditions for determining that the sequence is oscillating are not met. For example, as long as handoffs are made having inter-handoff periods greater than Threshold 1, the records are not considered by the oscillation detection process. When a handoff is made with an inter-handoff period less than threshold 1, the previous cell records are discarded, and the latest handoff record is stored in the table in the oldest cell position. Thereafter, as long as handoffs are made having interhandoff periods less than Threshold 1, the table builds up until the last four cells are included. If the MS remains in one cell longer than the time period specified by Threshold 1 prior to recording the last four cells, the previous cells are discarded, and the process starts over. Whenever the table contains four cells having intercell handoff periods less than Threshold 1, and the overall time period from the current cell to the oldest cell is less than Threshold 2, then the MSC determines that the sequence is oscillating. The MSC may then inhibit further handoffs for an inhibition time period, as shown in FIG. 3.

The Threshold 1 and Threshold 2 values may be changed to optimize the results depending on whether handoffs are being made between 2, 3, or more cells. A parameter may also be changed to control the queue length. For example, if handoffs are being made between 2 cells, the queue length over which the analysis is made may be 4 cells long (A-B-A-B). If handoffs are being made between 3 cells, the queue length may be 6 cells long (A-B-C-A-B-C). Thus, the N queue length is normally twice the number of cells involved in the handoff pattern.

In one embodiment, the oscillation detection function may operate in detail as follows. The following definitions are utilized in the discussion:

Handoff queue—a list of the last N cells where the MS has been located;

Oscillation—a contiguous sequence of length $\leq N/2$ which is repeated;

Sequence Indicator (s)—the expected sequence length of the oscillation;

m—the position in the queue where the last handoff is stored;

Inter-Handoff Time Interval (Threshold 1)—the maximum time allowed between handoffs for the sequence to be considered contiguous; and Oscillation Time Period (Threshold 2)—the maximum time allowed between the oldest and latest handoff in the contiguous and repeating sequence.

The position information (cell and time) when the call is set up is stored in the first available position (position 0), and the sequence indicator (s) is set to 1. For subsequent handoffs, if the time between position m and position m−1 is less than Threshold 1, then the oldest m items are removed from the queue, and the remaining item is stored in position 0. The sequence indicator (s) is reset to 1, m is set to 0, and the process waits for the next handoff.

It is then determined whether the cell in position m is equal to the cell in position (m−s) and whether m>(N/2)−1. If m is not equal to the cell in position (m−s) and m>(N/2)−1, then the oldest m−(N/2)+1 items are removed from the queue and the remaining m−(N/2)+1 items are shifted toward the bottom of the queue, and m is updated accordingly. If some items are removed in this step, the sequence indicator (s) is set to the current position m.

The MSC then determines whether the cell in position m is equal to any cells in positions (m−(s−x)) where $s-1>x \geq 0$.

If it is assumed that y is an ascending sequence and denotes the queue positions of each cell match, then if any cells match, the MSC determines whether the last 2·(m−y) positions are oscillating. If, however, there is no match between the cells in position m and position (m−s), the sequence indicator (s) is set to the next queue position (m+1).

The MSC flags the MS as oscillating if, for every cell contained in the last 2·(m−y) positions, there are at least two occurrences, and the time difference between the last and first cell positions in the last 2·(m−y) positions is less than the total oscillation time period. If a MS has been flagged as oscillating, then the queue is emptied, the current position information is stored at the bottom of the queue, and the sequence indicator (s) is set to 1.

EXAMPLE DETECTORS

Example 1

Assume a queue length of 8 (i.e., maximum sequence detector is N/2=4), and that an MS moves from cell A to B to A. The MS would be considered oscillating if the next handoff is to B, and the time criteria are met. The time criteria are met if the time between:

(1) Cell B (position 3) and cell A (position 2) is less than threshold 1;

(2) Cell A (position 2) and cell B (position 1) is less than threshold 1;

(3) Cell B (position 1) and cell A (position 0) is less than threshold 1; and (4) Cell B (position 3) and Cell A (position 0) is less than threshold 2.

Example 2

Assume a queue length of 8 (i.e., maximum sequence detector is N/2=4), and that an MS moves from cell A to B to C to B. If the next handoff is to cell C, then the oldest item in the queue (cell A) is removed. The queue then includes B to C to B to C. The MS would then be considered oscillating if the time criteria are met.

Oscillating Handoff Inhibition

FIG. 3 is a flow chart illustrating the steps of the oscillation inhibition process of the present invention. This process inhibits unnecessary handoffs on a per-MS basis once the MSC determines that an oscillating handoff condition exists. The inhibition process first determines at step 32 whether the signal strength from the currently serving cell (uplink and downlink) is above a safe threshold for maintaining the call. If either the uplink or the downlink signal strength from the currently serving cell is not above the safe threshold, the process moves to step 33 where the handoff is allowed. At 34, the MS is no longer classified as oscillating. The process then returns to step 13 of FIG. 2A and begins the oscillation detection process over again.

However, if it is determined at step 32 that the uplink and downlink signal strength from the currently serving cell is above the safe threshold for maintaining the call, the process moves to step 35 where further handoffs are inhibited for a predetermined inhibition time period which may be, for example, one minute. At step 36, it is determined whether or not the inhibition time period has expired If not, the process returns to step 32 and continues to monitor the MS's signal strength with the MS's serving cell. If the signal strength falls below the safe threshold during the inhibition time period, handoff of the MS is allowed. When the inhibition time period has elapsed, the process moves to step 37 where handoffs are again allowed. The process then returns to step 13 of FIG. 2A and begins the oscillation detection process over again.

Oscillation information gathered by the present invention may also be utilized by system operators to reconfigure cell parameters. For example, if many MSs are oscillating between two particular cells, the condition can be reported so that appropriate corrective action can be taken.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of handling oscillating mobile station handoffs between cells in a cellular telecommunications network having a mobile switching center (MSC) which controls the cells, and a plurality of mobile stations (MSs) operating in the cells, the method comprising the steps of:

detecting whether a MS is exhibiting an oscillating handoff pattern; and inhibiting handoffs of the MS upon detecting that the MS is exhibiting an oscillating handoff pattern, said inhibiting step including the steps of:

determining whether the MS's signal strength with the MS's serving cell is above a safe signal strength threshold for maintaining a call; and inhibiting handoffs of the MS upon determining that the MS's signal strength with the MS's serving cell is above the safe signal strength threshold.

2. The method of handling oscillating mobile station handoffs of claim 1 further comprising the step of allowing handoff of the MS upon determining that the MS's signal strength with the MS's serving cell is below the safe signal strength threshold.

3. The method of handling oscillating mobile station handoffs of claim 1 wherein the step of inhibiting handoffs includes inhibiting handoffs for a predetermined inhibition time period.

4. The method of handling oscillating mobile station handoffs of claim 3 wherein the step of inhibiting handoffs for a predetermined inhibition time period includes the steps of:

monitoring the MS's signal strength with the MS's serving cell during the inhibition time period;

determining whether the MS's signal strength with the MS's serving cell has fallen below the safe signal strength threshold; and allowing handoff of the MS upon determining that the MS's signal strength with the MS's serving cell has fallen below the safe signal strength threshold.

5. The method of handling oscillating mobile station handoffs of claim 4 further comprising allowing handoffs of the MS after the inhibition time period expires.

6. The method of handling oscillating mobile station handoffs of claim 1 wherein the step of detecting whether a MS is exhibiting an oscillating handoff pattern includes the steps of:

detecting a sequence of handoffs of the MS; and determining whether the handoff sequence shows a repeating pattern of cells that the MS is being handed off between.

7. A method of handling oscillating mobile station handoffs between cells in a cellular telecommunications network having a mobile switching center (MSC) which controls the cells, and a plurality of mobile stations (MSs) operating in the cells, the method comprising the steps of:

detecting whether a MS is exhibiting an oscillating handoff pattern by detecting a sequence of handoffs of the MS in which the number of handoffs is twice the number of cells involved in the handoffs, and determining whether the handoff sequence shows a repeating pattern of cells that the MS is being handed off between; and inhibiting handoffs of the MS upon detecting that the MS is exhibiting an oscillating handoff pattern.

8. The method of handling oscillating mobile station handoffs of claim 6 wherein the step of detecting whether a MS is exhibiting an oscillating handoff pattern also includes the steps of:

measuring an inter-handoff time period between each handoff in the sequence;

determining whether each inter-handoff time period is less than a first threshold value; and classifying the MS as oscillating upon determining that each inter-handoff time period is less than the first threshold value.

9. The method of handling oscillating mobile station handoffs of claim 8 wherein the step of detecting whether a MS is exhibiting an oscillating handoff pattern also includes the steps of:

determining an oldest handoff and a latest handoff in the sequence;

measuring a total oscillation time period between the oldest handoff and the latest handoff in the sequence;

determining whether the total oscillation time period is less than a second threshold value; and classifying the MS as oscillating upon determining that the total oscillation time period is less than the second threshold value.

10. A method of handling oscillating mobile station handoffs between cells in a cellular telecommunications network having a mobile switching center (MSC) which controls the cells, and a plurality of mobile stations (MSs) operating in the cells, the method comprising the steps of:

detecting whether a MS is exhibiting an oscillating handoff pattern, said detecting step comprising the steps of:

detecting a sequence of handoffs of the MS in which the number of handoffs is twice the number of cells involved in the handoffs;

measuring an inter-handoff time period between each handoff in the sequence;

determining whether each inter-handoff time period is less than a first threshold value;

determining an oldest handoff and a latest handoff in the sequence;

measuring a total oscillation time period between the oldest handoff and the latest handoff in the sequence;

determining whether the total oscillation time period is less than a second threshold value; and classifying the MS as oscillating upon determining that the total oscillation time period is less than the second threshold value;

determining whether the MS's signal strength with the MS's serving cell is above a safe signal strength threshold; and inhibiting handoffs of the MS for a predetermined inhibition time period, upon detecting that the MS is exhibiting an oscillating handoff pattern and upon determining that the MS's signal strength with the MS's serving cell is above the safe signal strength threshold.

11. A method of detecting a mobile station (MS) which is exhibiting an oscillating handoff pattern between cells in a cellular telecommunications network having a mobile switching center (MSC) which controls the cells, and a plurality of mobile stations operating in the cells, the method comprising the steps of:

detecting a sequence of handoffs of the MS in which the number of handoffs is twice the number of cells involved in the handoffs;

measuring an inter-handoff time period between each handoff in the sequence;

determining whether each inter-handoff time period is less than a first threshold value;

determining an oldest handoff and a latest handoff in the sequence;

measuring a total oscillation time period between the oldest handoff and the latest handoff in the sequence;

determining whether the total oscillation time period is less than a second threshold value; and classifying the MS as oscillating upon determining that the total oscillation time period is less than the second threshold value.

* * * * *